United States Patent Office 3,202,113
Patented Aug. 24, 1965

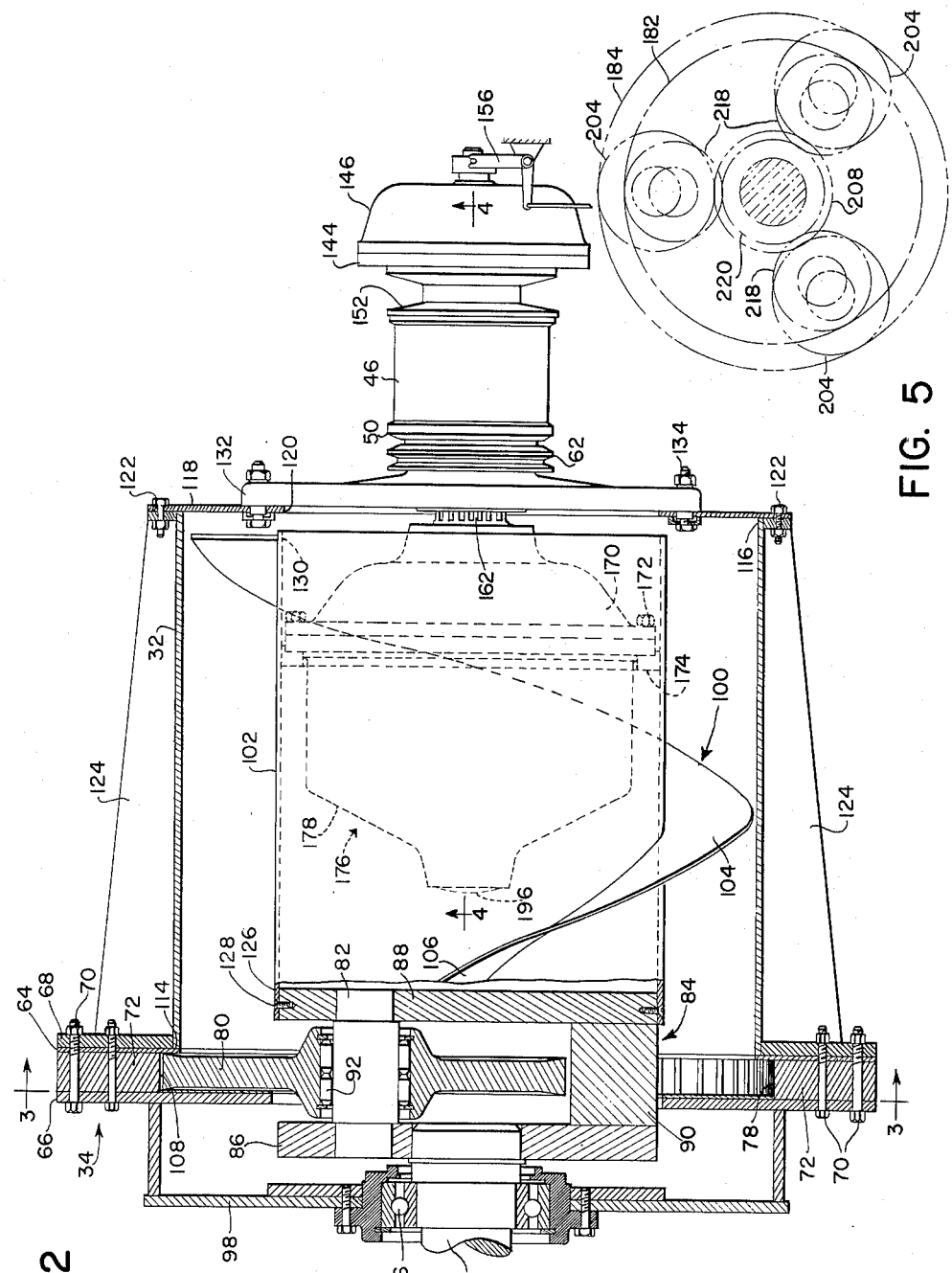

3,202,113
FORAGE WAFERING MACHINE
Mahlon L. Love, Osco, Ill., assignor to Deere & Company, Moline, Ill., a corporation of Delaware
Filed Feb. 4, 1963, Ser. No. 255,828
17 Claims. (Cl. 107—14)

This invention relates to a forage wafering machine and more particularly to novel and significant improvements in the drive therefor and arrangement of component parts related thereto.

A forage wafering machine is generally known as one which is intended to replace the conventional automatic hay baler in certain areas of the country and, like a baler, operates to gather and compress forage products into smaller compact products but, unlike a baler, functions at higher operating pressures and exploits multiple die cells to produce forage porducts, known generally as wafers, in various forms such as cubes, cylinders etc., having a unit density in the range of 25 to 50 pounds per cubic foot and dimensional characteristics in the range of ½ to 1 inch in cross section and lengths in the range of ½ to 3 inches more or less. The advantages of these products are many; for example, they may be easily handled, transported, fed, stored etc., and they depend for retention of their shape upon the compacting pressures utilized in their formation, with or without additives. At any rate, external binding media such as twine, wire etc., is not required.

In the early development of wafering machines of this character, it was felt that the pellet mill art could be drawn on, but these efforts proved futile because of the differences in types of forage material, differences in moisture content etc. Consequently, an entirely new order of machine has developed, bearing only a superficial resemblance to the conventional pellet mill wherein die rings and press wheels are used to achieve relatively small pellets formed of granular, uniformly pretreated material.

At least one significant difference between a forage waferer and a pellet mill is that the former is designed largely for operation in the field, picking up previously harvested and cured forage crops and feeding them to suitable die means from which the wafers ultimately emerge. Most forage wafering machines are driven by internal combustion engines of substantial horse power operating at relatively high speeds, typical horse power ranges being in the order of 100 to 200 h.p. operating at speeds of 2,000 to 3,000 r.p.m. However, experience has shown that the moving parts of the wafer-forming means cannot be driven at these speeds and therefore it is necessary to introduce various speed-reduction means into the drive train. On the other hand, other components, such as the feed means, can be operated at higher speeds. These have presented many problems to the designer.

According to the present invention, these problems are eliminated by the provision of a novel drive train incorporating speed-reduction means compactly assoicated within part of the feed means that feeds the die annulus. A significant object of the invention is to provide a speed-reduction means in the form of a planetary gear system. Other objects reside in the driving of the die means press wheel means at a relatively low speed while utilizing other portions of the drive means to drive higher-speed components. As a general object, the invention aims to provide a novel, compact and relatively inexpensive trouble-free design.

The foregoing and other important objects and desirable features inherent in and encompassed by the invention will become apparent as the preferred embodiment thereof is disclosed in detail in the ensuing description and accompanying sheets of drawings, the figures of which are described below.

FIG. 2 is an enlarged cross section on the line 2—2 of FIG. 1.

FIG. 5 is a schematic view, drawn to a reduced scale, as seen generally along the line 5—5 of FIG. 4.

Figure 1:
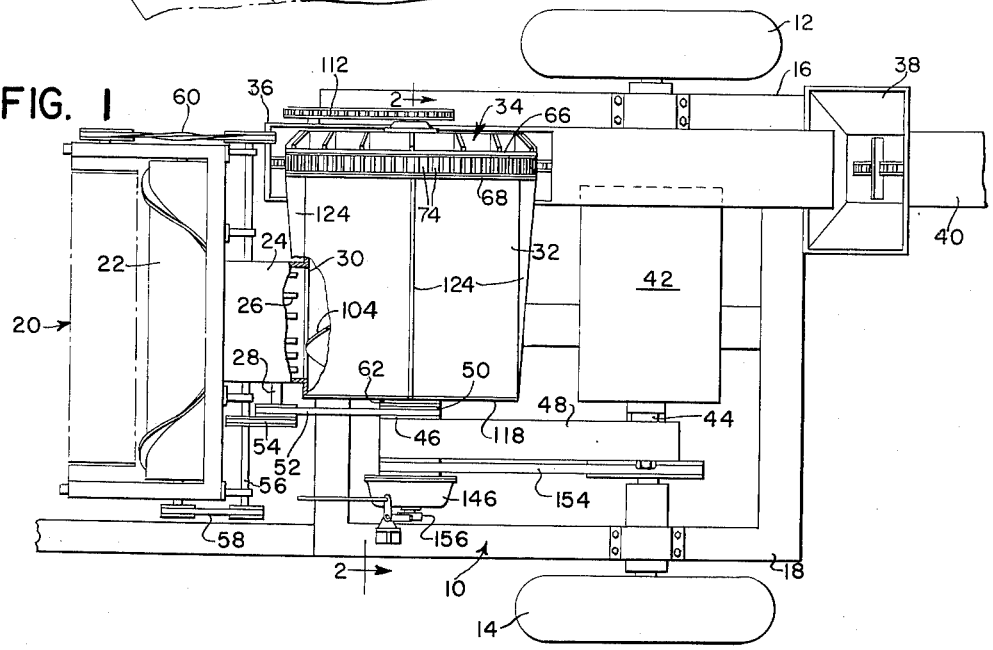
FIG. 1 is a fragmentary plan view of a typical forage wafering machine.

The machine chosen for purposes of illustration and illustrated as a whole in FIG. 1 may comprise a longitudinal main frame or support means 10 carried at its rear by right- and left-hand wheels 12 and 14, respectively, for advance over a field in the direction toward the left-hand side of the sheet. The frame has right- and left-hand sides respectively proximate to the right- and left-hand wheels 12 and 14, designated here at 16 and 18, respectively, for clarity.

The forward end of the frame carries, in any suitable manner, pickup means 20 for picking up forage crops from the field, it being understood that these crops have been previously harvested, windrowed and cured to a predetermined general moisture content on the order of, say, 15% by weight. The crop pickup means leads rearwardly and upwardly to a transverse reversely wound auger 22 which functions to narrow the received crop for introduction to a rearwardly extending feed casing 24 in which may be carried a rotary feed means 26, of any suitable type, driven externally by a shaft 28 extending toward the left-hand side of the machine.

The feeder house 24 is connected in material-transfer relationship to a feed opening 30 formed in the cylindrical wall of a feed housing 32, which has its principal axis disposed generally horizontally and transverse as respects the fore-and-aft extent of the support means or frame 10. By means to be presently described, crops introduced through the feed opening 30 to the interior of the feed housing 32 are moved axially toward the right (toward the top of the sheet in FIG. 1) for introduction into the wafer forming means, here designated in its entirety by the numeral 34. The forage crops and the like are formed herein into wafers of the general character referred to above and after extrusion through die cells, to be described later, are discharged into a conveyor means 36 which extends rearwardly and which delivers into a hopper 38 of a second conveyor 40 which may be utilized to transfer the wafers to a trailing vehicle (not shown) as is generally conventional. The wafering means, feed means and related components are driven in the first instance from a relatively high-speed source of power, here represented by an internal combustion engine 42 which has its driving shaft 44 at the left-hand side of the machine. The basic input for the wafering means and its related components is represented by a driving pulley 46 coaxially disposed as respects the feed housing 32 and located at the left-hand side of the machine in general fore-and-aft register with a pulley (not shown) on the engine shaft 44. The shaft 44 and pulley or sheave 46 are appropriately interconnected, as by a drive belt 48, which may be either a flat belt or a multiple-V-belt. The direction of rotation of engine shaft 44 is such that the top of the belt travels to the left as seen in FIG. 1. This means that the pulley or sheave 46 will rotate in a counter-clockwise direction as seen from the left-hand side of the machine.

Coaxially connected to the sheave or pulley 46 is a narrower pulley 50 from which a belt drive is taken as at 52 to the feed means 26 via the shaft 28. Additional belting and shafting may be utilized, as at 54, 56, 58 and 60, to drive the auger 22 and pickup 20 and any other related parts that are used in the material-transfer means, details of which are not material here. Still another pulley 62, coaxially connected to and closely adjacent the pulley 50, may be utilized for driving other components.

The wafering means 34 may be regarded essentially as an annulus 64 made up primarily of right- and left-hand ring-like side plates 66 and 68, respectively, rigidly secured together in coaxially spaced apart relation via a plurality of bolts 70 and intervening spacers or die blocks 72, the latter being arranged in a uniformly circumferentially spaced apart relation to afford a like plurality of radial die cells or openings 74. In the present case, the inner end of each die cell 74, as at 76, is its crop-inlet end, and the cells radiate uniformly from an inner periphery of the annulus which in effect affords a track 78 over which a press wheel 80 runs or rolls as it rotates about an axis eccentric to the axis of the annulus. In the present case, the press wheel is carried by a shaft 82 supported by carrier structure 84 which itself is coaxial on the annulus axis.

The carrier structure here includes right- and left-hand generally similar circular members 86 and 88, respectively, both having their centers on the annulus axis. These members are spaced apart not only by the shaft 82, but also by a bridging member 90 which may be utilized as a counterweight for the press wheel 80. Any form of rigid unifying structure may be used. In this case, opposite ends of the press wheel shaft 82 are fixed in the members 86 and 88 and the press wheel 80 is journaled on the shaft as by suitable bearings 92. Since this arrangement disposes the press wheel shaft 82 eccentric to the annulus axis, the structure may be regarded as a crank, the members 86 and 88 affording cheeks for the crank. The right-hand or outer cheek is rigidly secured to a shaft 94 which projects to the right side of the supporting frame 10 as an external driven member, the purposes of which will be explained later. The means for supporting the shaft 94 may include an appropriate bearing 96 carried in the final analysis by the support means 10 through the intermediary of plate structure 98 which is rigid with the annulus 64 which in turn is, of course, rigidly carried by the support means 10. Inasmuch as the press wheel 80 is carried between the cheek members 86 and 88, it follows that the carrier structure 84 straddles the press wheel, providing the cheek member 86 at one side of the press wheel and the other cheek member 88 at the other side of the press wheel, which is important from the standpoint of utilizing the cheek 88 as support for the inner end of a rotary feed device indicated in its entirety by the numeral 100.

Figure 3:
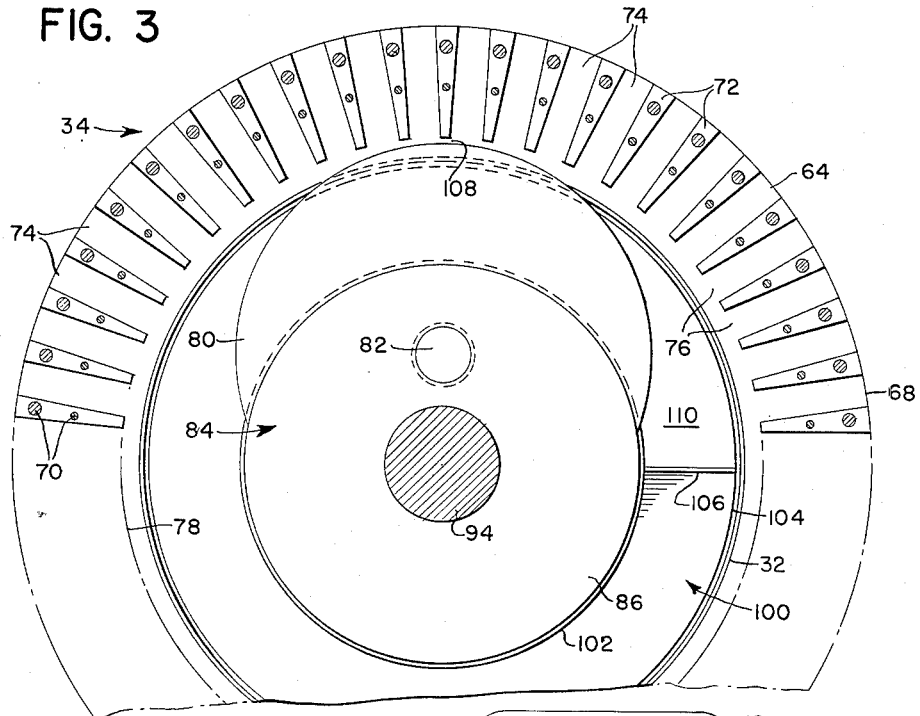
FIG. 3 is a still further enlarged cross section taken on the staggered line 3—3 in FIG. 2.

The device 100 is here an auger having a coaxial tubular or hollow core 102 on which is wound a helical flight 104 having a terminal end at 106 adjacent to the annulus 64 and leading to the annulus track 78 in angularly offset relation to the press wheel 80. The relationship may best be understood by looking at FIG. 3 and noting that the shaft 94 rotates in a clockwise direction, which is true also of the device 100, since the core 102 is rigidly secured to the cheek member 88 at the left-hand side of the annulus track. Since the shaft 94 turns in a clockwise direction, it follows that the press wheel shaft 82 will also turn in that direction, causing the press wheel to roll in a counterclockwise direction, it being noted that the outer periphery of the press wheel 80 runs substantially on the track 78; although, there is, for operational purposes, a limited clearance in this area as suggested by the numeral 108 in FIGS. 2 and 3. Because of the tangential or rolling relationship between the press wheel 80 and the annulus track 78, there will occur ahead of the press wheel, having regard to the direction of rotation of the shaft 94, what may be regarded as a feed "crescent" at 110. It is to this crescent that the terminal end 106 of the auger flight 104 delivers, it following that the terminal end 106 of the flight is always "timed" with the crescent, since the two occupy rotating but non-changeable relationships during operation of the wafering means.

The auger 100 is of course coaxially disposed within the auger housing 32, so that the peripheral edge of the auger flight has limited peripheral clearance with the internal surface of the cylindrical wall of the housing 32. It will be clear from FIG. 1 that the feed opening 30, which leads to the interior of the housing 32 and thus to the rotary device or auger 100, is axially offset—here to the left—of the annulus 66. Consequently, the auger flight 104 is designed as to lead and rotation to feed crops axially through the housing 32 to the crescent 110 so that the forage crops received therein are successively forced into the die cells 74 via their inlet ends 76 to ultimately be extruded as wafers which will be received by the forward end of the conveyor 36 for ultimate transfer to the rear conveyor 40 via the hopper 38. It is at this point that the external driven shaft 94 becomes significant, since this may be utilized to establish a driving connection to the elevator, here indicated by a chain and sprocket drive 112 (FIG. 1). For reasons to be pointed out subsequently, the speed of the conveyor 36 should be relatively low.

Looking now at FIG. 2, it will be seen that the auger core 102 has opposite ends respectively proximate to opposite ends of the auger housing 32. That is to say, the auger housing is arranged and is dimensioned so that its annulus-proximate end, as at 114, is substantially in axial register with the die track 78, a slight marginal difference being provided to guard against escape of material from the die cells in the event of rebound, which normally occurs, especially with "springy" material. The opposite end of the housing 32, as at 116, is partially closed by a circular plate 118 having a central circular opening 120, here of a diameter substantially equal to that of the auger core 102. The plate 102 may be connected to the end 116 of the housing 32 as by bolts 122, and suitable braces 124 may be utilized to strengthen the housing 32 as well as to connect it to the annulus 64. This in effect mounts the housing rigidly on the support means 10 through obvious intermediary components.

The inner or die-proximate end of the auger tube or core 102, indicated at 126 is, as previously stated, a coaxial extension of the crank cheek 88. Any form of securing means may be utilized to unite the two, a plurality of countersunk screws 128 being illustrated here as representative. The opposite end of the core 102 is open at 130, for purposes to presently appear. Broadly, the core may be regarded as hollow, at least at its left-hand end (as respects the machine; right-hand end as shown in FIG. 2).

From the description thus far, it is clear that the rotary device or auger 100 is supported, at least at its right-hand end, by the carrier structure 84 and its association with the support means, and it remains only to support the auger at its left-hand end. This is accomplished by novel structure which forms a significant part of the present invention.

The end plate 118 at the left-hand end of the auger housing 32 was previously described as having a circular opening 120 therein. Marginal portions of the plate surrounding this opening afford means for the mounting of a support part 132, which is here a relatively heavy structural member marginally secured to the end plate 118 as by a plurality of bolts 134. This disposes the part or plate 132 in coaxial relationship to the right-hand end 130 of the auger core 102 and at the same time substantially closes the left-hand end of the auger housing 32, which closure is effected by the association with the plate 132 of a coaxial external or leftwardly extending supporting sleeve 136 which is rigidly secured to the central or hub part of the plate 132 as by a plurality of cap screws 138. The sleeve 136 carries the pulley combination 46–50–62 via coaxially spaced apart bearings 140 and 142. Coaxially rigid with the pulley 46 is a driving part 144 of a clutch 146, the driven part of which is represented by a clutch plate 148 splined in any conventional manner to a driving shaft 150 which extends coaxially loosely through the cover plate sleeve 136 and into the interior of the housing and auger 32 and 100 for driving the auger, and ultimately the right-hand external output shaft 94, in a manner to be presently detailed. The spaced relationship between the clutch part 144 and the wide pulley 46 is such as to afford another pulley groove at 152, which may be utilized to drive the rear wheels 12 and 14 of the machine, as by a belt 154, in cases in which the machine is self-propelled rather than being drawn by a tractor or other vehicle.

The purpose of the clutch 146 is to provide means for establishing engagement and disengagement between the driving pulley 46 and the internal shaft 150, and any suitable clutch throw-out means may be provided, as at 156.

A bearing 158 journals the left-hand or outer portion of the shaft 150 within the combination pulley 46–50–62–152. Other portions of the shaft 150 are supported in a manner to be presently described.

Up to this point, it will be seen that the cover plate 132 becomes a rigid part of the non-rotatable auger housing 32. In addition to the external sleeve 136, the plate 132 carries an internal sleeve 160. An axially separable splined connection at 162 is afforded between the sleeve 160 and cover plate 132. A bearing 164 is carried internally of the sleeve 160 to support the inner end of the driving shaft 150. The sleeve 160 extends inwardly to appropriate shoulder portions on which are fitted axially spaced bearings 166 and 168 which provide ultimate journaling support for the left-hand end of the auger tube 102, which is here effected by a cup-shaped member or casting 170 of circular shape and peripherally connected by cap screws 172 to a ring 174 welded interiorly to the auger tube 102.

It is a significant feature of the invention that the element or member 170, in addition to journaling the auger tube, also affords means for driving the auger tube, and at a rate lower than that at which the input pulley 46 is driven in the first instance. To accomplish this result, the member 170 is part of speed-reduction means, designated in its entirety by the numeral 176. The speed-reduction means is here shown as being of the double planetary type and the member 170 combines with a complementary casing member 178 to afford the output carrier of the planetary system. The member or casing 178 is secured to the member 170 and to the auger tube ring 174 by the cap screws 172 described above. The combined members 170–178 provide an enclosing casing for the planetary gearing. In this regard, it will be observed that the various bearings, already described, are equipped with appropriate seals to exclude foreign matter and to retain lubricant. Since these are conventional, they have been omitted in the interests of clarity.

As part of the planetary system, the previously described internal sleeve 160 extends axially inwardly to afford the reaction means for the planetary reduction system, which is here in the form of a fixed member 180 carrying first and second ring gears 182 and 184. The member 180 is appropriately splined to the interior end of the sleeve 160 as at 186, being supplemented by a nut 188 and retaining pin 190. Consequently, the two ring or internal gears 182 and 184 are fixed or nonrotatable, tracing their support back to the cover plate 132 which, as already described, is a rigid part of the fixed auger housing 32.

Appropriately splined to the interior end of the casing 170–178, as at 192, is a stub shaft 194 which affords part of the carrier system for the planetary gearing. The inner end of the hub portion of the member 170–178 may be appropriately closed by a concavo-convex closure member 196, which enhances the enclosing characteristics of the member or element 170–178.

Figure 4:
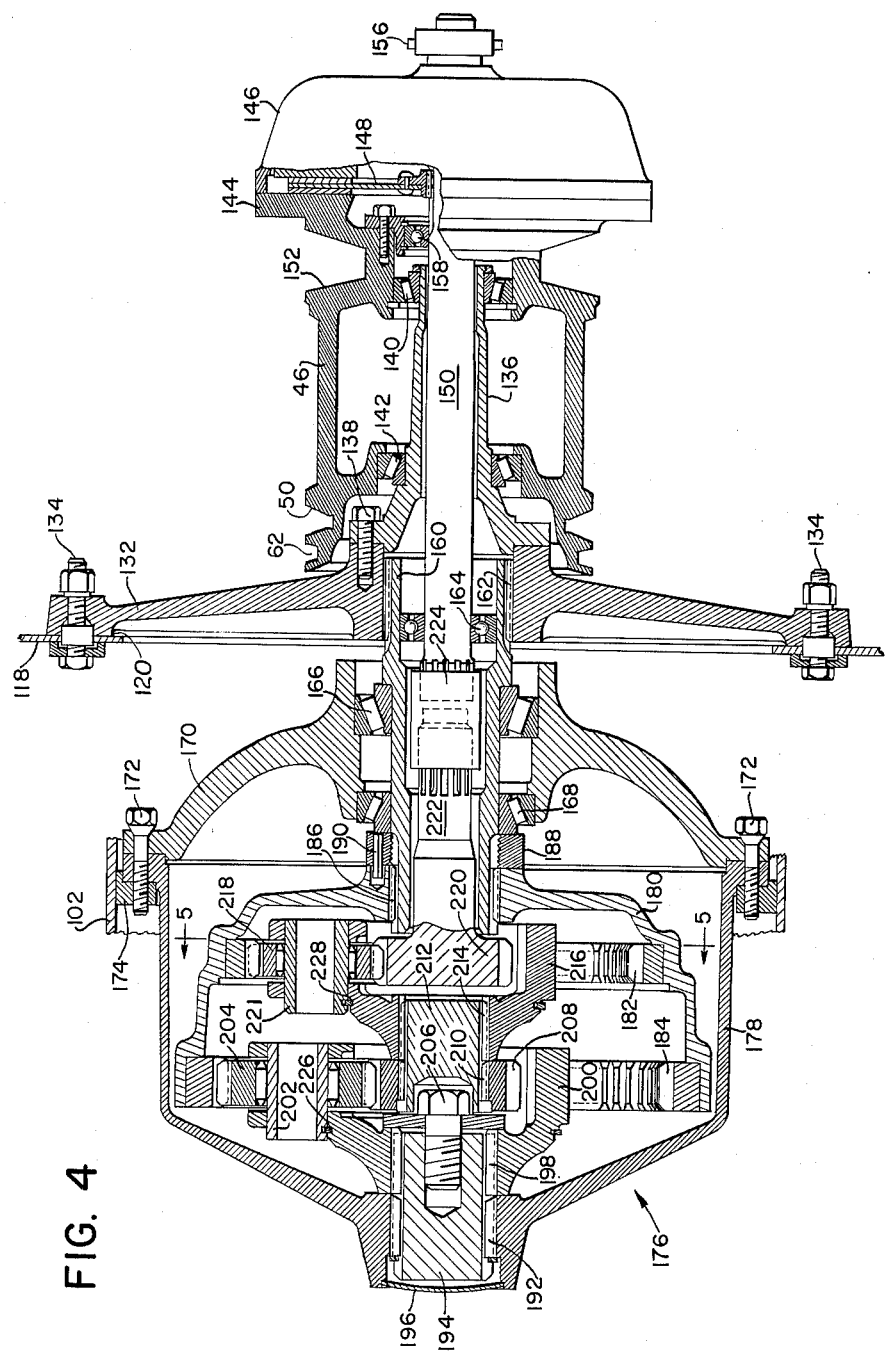
FIG. 4 is an enlarged transverse section on the line 4—4 of FIG. 2.

The stub shaft 194 extends axially to the left (as respects the machine; to the right in FIG. 4) where it has a splined connection 198 with a planetary carrier arm 200. This may be typically of the type including three arms; although, only one is shown. The illustrated arm carries a shaft 202 which journals a planetary pinion 204 in constant mesh with the second ring gear 184. The carrier arm 200 is retained on the enclosed end of the stub shaft 194 by a cap screw and washer assembly 206. The presence of three similar planetary pinions 204 is indicated in FIG. 5.

Supported by and in constant mesh with the three planet pinions 204 is a second sun gear 208 which is splined at 210 to a short shaft 212 which is coaxial with the stub shaft 194. The shaft 212 is in turn splined at 214 to an initial or first carrier 216 which carries a plurality of planet pinions 218 via planet pinion shafts 221. Although only one planet pinion 218 appears in FIG. 4, the presence of the three pinions is indicated in FIG. 5.

The planet pinions 218 are of course in constant mesh with the first ring gear 182 and are also in constant mesh with a first sun gear 220 which is here formed coaxially integral with a shaft 222 having a splined coaxial coupling 224 to the interior end of the driving shaft 150.

The planet pinion shafts 202 in the secondary planet system are retained by a snap ring 226, and a similar snap ring is provided at 228 for the primary planetary system including the planet pinions 218 and their respective shafts 220, a construction which follows that forming the subject matter of U.S. Patent 2,959,073.

Because of the equal angular spacing of the planet pinions 218 and their supporting and meshing relationship to the ring gear 182 and sun gear 220, the sun gear and its associated shaft need no special bearing. In effect, the sun gear 220 is allowed to float relative to the planet pinions and consequently finds its own center. It is subjected to no bending or other loads, other than torque. The same is true of the sun gear 208 which, as previously described, is an integral part of the primary carrier 216; that is to say, the sun gear 208 is floatingly supported by its mesh with the three equally spaced planet pinions 204 which in turn are supported by the ring gear 184. This provides a compact design eliminating complicated internal bearing structures. As in the case of the primary planet system 220–218–182, the secondary system 208–204–184 is subjected only to torque loads.

With the clutch 146 engaged, the shaft 150 becomes an input or driving shaft which of course drives the first sun gear 220. The reduction is accomplished through the planet pinions 218, with the first carrier 216 as the output, since the first ring gear 182 is fixed. The carrier output 216 provides the input at the sun 208 of the secondary planet system and a second reduction is effected via the second set of planet pinions 204, since the second ring gear 184 is also fixed, it being an integral part of the member 180 which in turn is splined to the supporting sleeve 160, and that in turn is, of course, fixed to the cover plate 132 which is fixed to the fixed auger housing 32. Consequently, the double ring gear structure or means 182–184 becomes the reaction means and the second carrier 200, which is in effect an integral part of the element 170–178, becomes the output. Since this is connected to the auger tube 102, it drives the auger or rotary device 100 at a speed far below that of the input speed. In the present case, the input speed is in the order of 2400 r.p.m. and the auger speed is on the order of 144 r.p.m., a reduction of approximately 16.6 to 1.

Since the auger drives the carrier structure 84, the shaft 94 is also driven at the same speed as the auger, as is the press wheel 80. In a machine having the dimensional characteristics of that illustrated, this is an optimum speed for producing acceptable wafers. One of the features is that the speed-reduction means 176 is located interiorly of the auger housing 32—in fact, interiorly of the auger tube 102—thus removing it from space externally of the structure that could be occupied by other components. For example, it is now feasible to provide a close-coupled relationship between the drive as represented by the input sheave or pulley 46 and the auger, thus materially narrowing the machine. At the same time, the output shaft afforded at 94 may be utilized to drive other slow-moving components. The pulley 46 is capable of receiving the high-speed output of the internal combustion engine 42 (or its equivalent) and at the same time may be utilized to transfer appropriate high-speed drive to such components as the feed means 26 and related elements.

The clutch 146 may be disengaged to discontinue operation of the wafering means, and also of the elevators 36 and 40 during times when it is undesirable to deliver wafers to the trailing vehicle, as when the vehicular train is turning corners.

Features and advantages other than those enumerated will readily occur to those versed in the art, as will many modifications and alterations in the preferred embodiment disclosed, all of which may be achieved without departure from the spirit and scope of the invention.

What is claimed is:

1. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; speed-reduction drive means coaxially contained at least in part in said hollow core and including a rotatable driven member drivingly connected to said core, a support member coaxial with the core and rotatably carrying the driven member and axially exposed at said open end of the core, and a driving member engaging the driven member and projecting axially at the second end of said core and feed housing; means mounting the support member on the support means; and means for driving the driving member.

2. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; and mounting and drive means carried by the support means at the second end of the housing and coaxially journaling said second end of the element, including speed-reduction drive means contained at least in part in said core and having a driven member connected to the element and a driving member connected to said driven member and axially exposed at said second end of the housing.

3. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; and a three-member planetary gear reduction drive means coaxially contained in part in said hollow core and including a reaction member coaxial with the core and fixed to the support means, a rotatable coaxial input member, and a rotatable driven member driven by said input member and drivingly connected to the core.

4. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; and planetary gear reduction drive gearing coaxially contained in part in said hollow core and including ring gear means coaxial with the core and fixed to the support means, rotatable coaxial input sun gear means, and rotatable carrier means drivingly connected to the core and including planet gear means meshing with the sun and ring gear means.

5. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; a support part fixed to the support means and the housing at the second end of the housing and having an opening coaxially therethrough, said part including a first coaxial bearing exteriorly of the housing and a second coaxial bearing interiorly of the housing and journaling the core; a driving shaft coaxially journaled by the first bearing and projecting interiorly toward the open end of the core; and speed-reduction drive means within the core and drivingly interconnecting the shaft and the core.

6. The invention defined in claim 5, in which: the reduction means includes a planet carrier means connected to the core and journaled on said second bearing, a sun gear means coaxially driven by the shaft within the core, ring gear means within the core and coaxially fixed to the support part, and planet pinion means journaled on the carrier and meshing with the sun and ring gear means.

7. The invention defined in claim 6, in which: the carrier means is in the form of a casing enclosing the planet pinion means, the sun gear means and the ring gear means.

8. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; a support part fixed to the support means and the housing at the second end of the housing and having an opening coaxially therethrough; planetary reduction gearing coaxially in the hollow core and including ring gear means having a coaxial sleeve fixed to the support part at the opening therein, a carrier connected to the core and journaled on the sleeve and journaling planet pinion means in mesh with the ring gear means, and an input shaft extending rotatably and coaxially through the support part opening and sleeve and having sun gear means in mesh with the planet pinion means.

9. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; a support part fixed to the support means and the housing at the second end of the housing and having an opening coaxially therethrough; planetary reduction gearing coaxially in the hollow core and including a reaction member having a coaxial sleeve fixed to the support part at the opening therein, and first and second coaxially offset ring gears fixed to the sleeve, an input shaft extending rotatably and coaxially through the support part opening and sleeve and having a first sun gear generally in the radial plane of the first ring gear, a first carrier having first planet pinions meshing with the first sun gear and first ring gear and having a second sun gear coaxially fixed thereto generally in the radial plane of the second ring gear, and a second carrier coaxially connected to the core and having second planet pinions meshing with the second sun gear and second ring gear.

10. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure carried by the support means adjacent to the annulus and rotatably carrying the press wheel and the first end of the feed element; and mounting and drive means carried by the support means at the second end of the housing and coaxially journaling said second end of the element, including speed-reduction drive means contained at least in part in said core and having a driven member connected to the element and a driving member connected to said driven member and axially exposed at said second end of the housing.

11. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed opening therein axially offset from the annulus; means carrying said housing on the support means; means for feeding forage crops axially of the housing and into the track, including a rotary feed element coaxially within said housing and having first and second ends respectively proximate to said first and second housing ends; carrier structure carried by the support means adjacent to the annulus and rotatably carrying the press wheel and connected to the first end of the feed element for rotation therewith; and mounting and drive means carried by the support means at the second end of the housing and coaxially journaling said second end of the element, including speed-reduction drive means interiorly of the housing and having a driven member connected to the element and a driving member connected to said driven member and axially exposed at said second end of the housing.

12. In a machine for wafering forage crops and the like, the combination of a fore-and-aft support means having first and second sides; die means in the form of an annulus carried at the first side of the support means on a transverse axis and having a plurality of circumferentially spaced die cells and an inner peripheral track from which said cells radiate; a press wheel arranged eccentrically within the track for orbital movement so that the periphery of the wheel runs substantially on the track to extrude forage material through the cells as wafers; a feed housing on the support means in substantial coaxial register with the track and extending toward the second side of the support means, said housing having a feed inlet opening; drivable feed means for feeding forage crops into the opening; a rotary feeder in the housing for moving crops from the feed opening to the track; rotatable carrier means on the support means and carrying said feeder for rotation and carrying the press wheel for orbital movement, said carrier means including an external driven member rotating with said feeder and extending coaxially at the first side of the support means; an external driving means at the second side of the support means and coaxial with the feed housing; a relatively high-speed power source on the support means and drivingly connected to the driving means; speed-reduction means interiorly of the housing and connected between the driving means and the feeder to drive the latter at a lower speed; means drivingly connecting the driving means to the feed means at said second side of the support means; conveyor means at said first side of the support means for receiving wafers from the die cells, and means drivingly connecting the conveyor means to the aforesaid external driven member.

13. In a machine for wafering forage crops and the like, the combination of a fore-and-aft support means having first and second sides; die means in the form of an annulus carried at the first side of the support means on a transverse axis and having a plurality of circumferentially spaced die cells and an inner peripheral track from which said cells radiate; a press wheel arranged eccentrically within the track for orbital movement so that the periphery of the wheel runs substantially on the track to extrude forage material through the cells as wafers; a feed housing on the support means in substantial coaxial register with the track and extending toward the second side of the support means, said housing having a feed inlet opening and a rotary feeder in the housing for moving crops from the feed opening to the track; carrier means on the support means and carrying said feeder for rotation and carrying the press wheel for orbital movement, said carrier means including an external driven member rotating with said feeder and extending coaxially at the first side of the support means; an external driving means at the second side of the support means and coaxial with the feed housing; a relatively high-speed power source on the support means and drivingly connected to the driving means; speed-reduction means interiorly of the housing and connected between the driving means and the feed device to drive the latter at a lower speed; first drivable means drivingly connected to the driving means at said second side of the support means; and second drivable means at said first side of the support means and drivingly connected to the aforesaid external driven member.

14. The invention defined in claim 13, including: clutch means for connecting and disconnecting one of the drivable means.

15. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure coaxially fixed to the first end of the feed element and straddling the press wheel and coaxially journaled on the support means at the side of the annulus opposite to said element, said structure having eccentric means journaling the press wheel; a support part fixed to the support means and the housing at the second end of the housing and having an inner coaxial sleeve within the core, an outer coaxial sleeve external to the housing, an inner bearing on and encircling the inner sleeve and journaling the element and an outer bearing within the outer sleeve; and a driving shaft extending coaxially through the sleeves and journaled in said outer bearing and drivingly connected to the element within said core.

16. In a machine for wafering forage crops and the like, the combination of support means; die means in the form of an annulus carried by the support means on a generally horizontal axis and including a plurality of circumferentially spaced die cells and an inner peripheral track from which said cells radiate; means including a press wheel arranged eccentrically within the track for orbital movement about the annulus axis with the outer periphery of said wheel substantially in rolling contact with said track to force forage crops into the die cells; a feed housing alined with the annulus on the axis thereof and having a first end substantially in axial register with said track and a second end axially spaced from said track, said housing having a feed inlet opening therein axially offset from the annulus; means carrying said housing on the support means; means for feeding forage crops axially of the housing and into the track, including a rotary feed element coaxially within said housing and having first and second ends respectively proximate to said first and second housing ends, said element having a hollow core opening axially at its second end; carrier structure carried by the support means adjacent to the annulus and rotatably carrying the press wheel and the first end of the feed element; an input shaft coaxially disposed at said second end of the housing and extending into said core and terminating short of the first end of said core; means coaxially within the core and connecting said input shaft to the core; and means journaling said element and input shaft at said second end of the housing.

17. The invention defined in claim 16, in which: said last named means includes a pair of independent coaxially spaced apart bearings, one for the element and one for the input shaft.

References Cited by the Examiner

UNITED STATES PATENTS

| | | | |
|---|---|---|---|
| 2,288,824 | 7/42 | Meakin | 74—125.5 |
| 2,336,114 | 12/43 | Meakin. | |
| 2,905,010 | 9/59 | Rieser | 198—127 |
| 2,959,073 | 11/60 | Doerfer et al. | 74—801 |
| 3,070,002 | 12/62 | Mathews. | |

FOREIGN PATENTS

| | | |
|---|---|---|
| 20,970 of 1929 | 7/30 | Australia. |
| 875,544 | 6/42 | France. |
| 1,250,174 | 11/60 | France. |

OTHER REFERENCES

Western Livestock Journal, April 1961, pages 36 and 39.
Agricultural Engineering S.671.A3, August 1961, pages 412–415 and 423.

WALTER A. SCHEEL, *Primary Examiner.*
CHARLES A. WILLMUTH, *Examiner.*